Patented Oct. 23, 1951

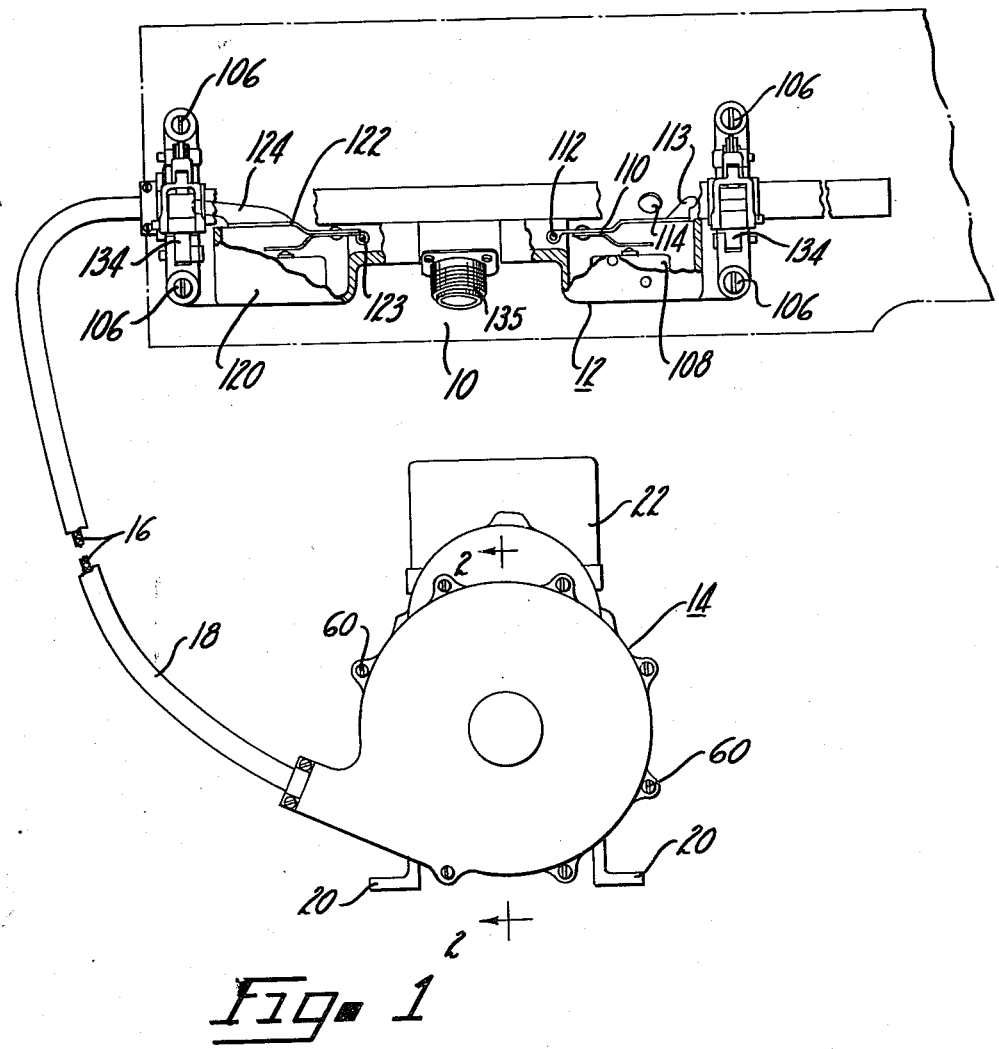

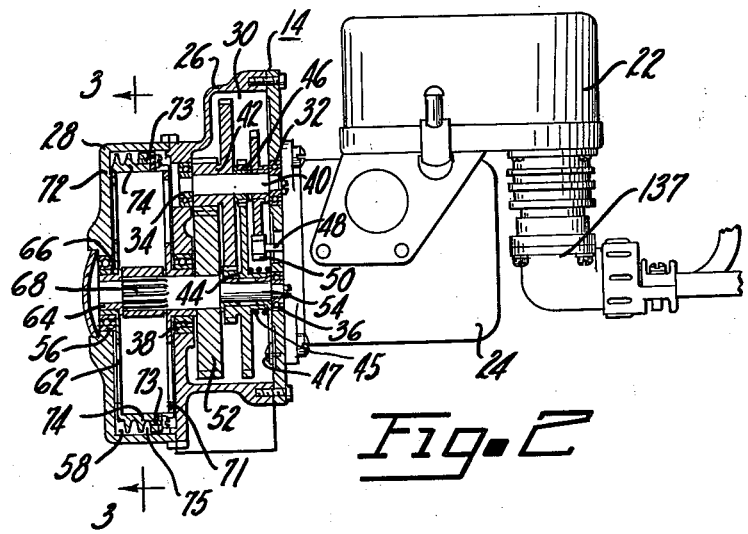
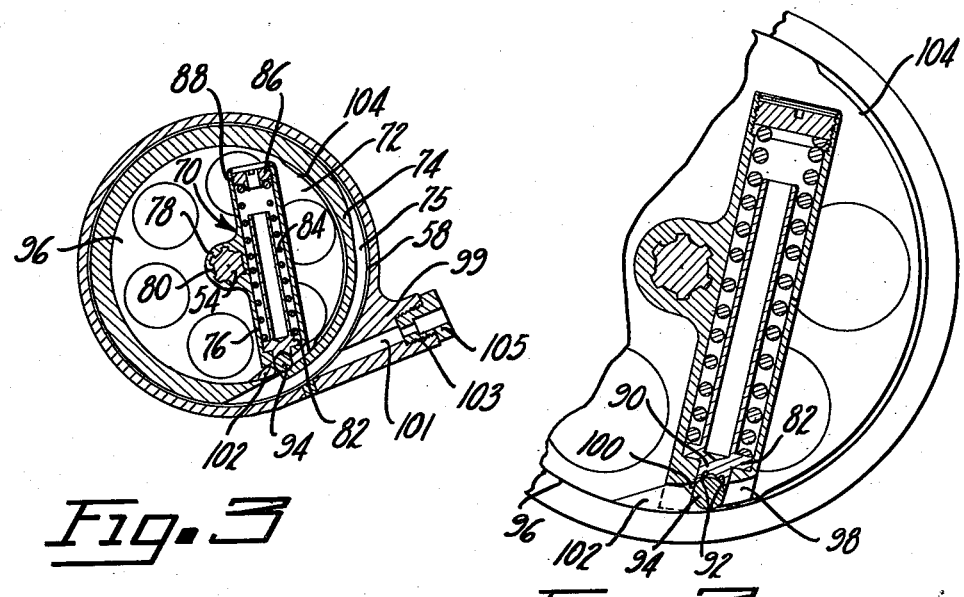

2,572,612

UNITED STATES PATENT OFFICE 2,572,612

AUTOMATIC GUN CHARGER

George A. Goepfrich and William C. Rohn, South Bend, Ind., assignors to Bendix Aviation Corporation, South Bend, Ind., a corporation of Delaware Application November 8, 1944, Serial No. 562,542

2 Claims. (Cl. 89—1)

This invention relates to aircraft armament and is particularly concerned with provision of apparatus for automatically charging machine guns.

Our present day types of military aircraft are equipped with one or more machine guns located in the wings or in the fuselage at points which are somewhat remote from the pilot or gunner. In most instances the guns are provided with remote trigger means, located on or near the control stick of the airplane, and adapted to actuate a solenoid for firing the guns.

In the normal operation of a machine gun a reciprocable charging block is provided which initially must be pulled rearwardly and released to feed the first cartridge from the ammunition belt into the gun. After the first cartridge is fed into the gun and fired the gun will automatically eject the used cartridge and feed another one into the gun chamber. When defective ammunition is inserted into the gun chamber, misfiring of the gun results which, of course, interferes with automatic gun operation. This misfired cartridge may be removed by manually operating the reciprocating block to extract the defective cartridge or dud and then feeding a new one into the gun chamber. After this operation, the gun is again ready for automatic operation. Most guns are so located in the aircraft that manual charging will be very difficult if not impractical. It is to meet this problem of manual charging that an improved automatic means for simulating normal gun operation has been introduced.

It is, therefore, an object of this invention to provide a mechanism automatically controlled by the reciprocating portion of a machine gun for charging the gun should it become jammed.

A further object resides in the provision of an automatic mechanism adapted to engage the reciprocating bolt of a machine gun for a simulating normal gun operation should the gun become jammed.

Another object of the invention is to provide an electrically operated mechanism responsive to the position of the reciprocating bolt of a machine gun for charging the same in the event a defective cartridge has been inserted into the gun chamber.

An important object of this invention resides in the provision of an automatic charging mechanism adapted to exert a predetermined force in retracting the bolt stud of a gun for ejecting a cartridge therefrom, after which the bolt is released for unimpeded forward movement for feeding a new cartridge into the gun chamber.

A further important object of the invention lies in the provision of a charging mechanism which has its power means located remotely from the gun to be charged.

A further object of the invention is to provide a gun charging mechanism which requires no adjustments and a minimum of attention.

Still other objects and features of the invention will become apparent from the following detailed description, reference being had to the accompanying drawings, in which:

Figure 1 shows the device of the invention connected to a gun;

Figure 2 illustrates a longitudinal sectional view taken substantially on the line 2—2 of Figure 1 with some of the parts shown in elevation;

Figure 3 shows a sectional view taken on the line 3—3 of the device shown in Figure 2;

Figure 3a is an enlarged fragmentary view of the detent mechanism shown in Figure 3;

Figure 4:
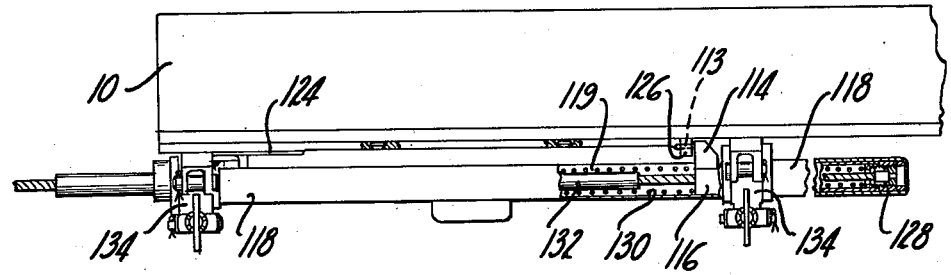
Figure 4 is a top plan view of that portion of the mechanism which engages the gun bolt with sections cut away showing the internal parts.
Figure 5:
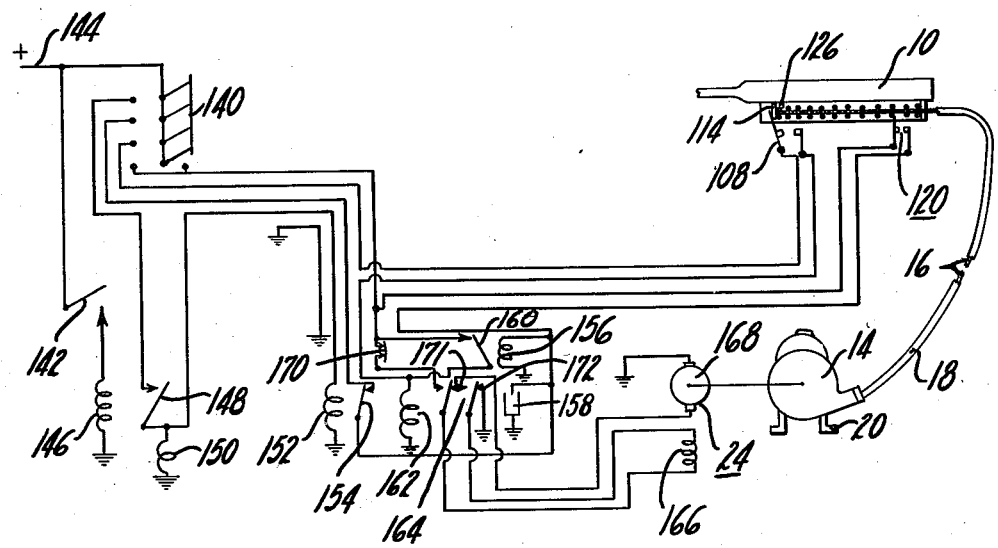
Figure 5 is a wiring system for the mechanism of Figure 1.

Referring now to Figure 1, there is shown a gun 10 on which is mounted a bolt retracting mechanism or charging mechanism 12 which is actuated by a power apparatus 14 connected to the retracting mechanism 12 through a cable 16 and a flexible conduit 18. A pair of legs 20 integral with the power apparatus are adapted to secure the same in position. However, the fastening means for the legs needs only to be sufficient to carry the weight of the apparatus and need not be strong enough to withstand the force necessary for operating the charging mechanism since this is taken care of by the conduit 18. That is, the conduit is constructed to offer sufficient axial resistance to withstand the axial thrust applied to the conduit due to the operation of the retracting mechanism. With such an arrangement the conduit takes the reactive force of the cable which would otherwise be borne by the power apparatus fastening means. This method of installing the power apparatus has the advantage that it facilitates installation. Neither are there any pulleys to be located in the aircraft for the cable.

The power apparatus 14 includes a control box 22, motor 24, speed reducing unit 26 and a torque limiting drive mechanism 28 to which the cable 16 and the conduit 18 are connected. The speed reducing unit 26 comprises a housing 30 with which the legs 20 are integral. Formed in the housing are bearing members 32, 34, 36 and 38, the first two of which support a shaft 40 to which is fixed a cluster gear 42 driven by a cluster gear 44 which receives its driving force through cluster gear 46 adapted to freely rotate on the shaft 40. A spring 45 encircles the hub of gear 44 in the manner shown, to restrict the gear to one way rotation to thereby render the power apparatus irreversible. The spring is held against rotation by a screw 47 engaging the housing 30. A shaft 48 of the motor 24 has keyed thereto a gear 50 engaging the gear 46 for driving the latter gear. Meshing with gear 42 which is fixed to shaft 40 is a gear 52 drivably connected to shaft 54 which has one end carried by the bearing 36 and its other end carried by bearing 56 located in a housing 58 adapted to house the torque limiting drive mechanism. The housing 58 is secured to the housing 30 by screws 60. A detent cage 62 carried by the bearings 38 and 56 is freely rotatable within the housing 58. A bushing 64 is introduced between a hub portion 66 of the detent cage and a shaft 54 to provide a bearing surface for the shaft. The shaft 54 is splined at 68 for drivably engaging a detent mechanism 70 adapted to rotate the detent cage 62, which comprises a disc-shaped member 71 securely fastened to a member 72 by screws 73 and a sheave 74, formed integrally with member 72. The sheave has grooves 75 therein for cooperating with the cable 16 which winds into said grooves. The end of the cable engaging the sheave is fastened thereto in any desirable manner such as welding, not shown. The detent mechanism 70 comprises a casing 76 having an enlarged portion 78 drilled and splined at 80 for engaging the shaft 54. The casing 76 houses a piston 82 spring-urged by a spring 84 which has one end engaging the piston 82 and the other end abutting an adjusting nut 86 which threadedly engages the casing at 88. The piston 82 has a reduced portion 90 with inclined faces 92 adapted to form bearing surfaces for a roller 94 which travels around the inner periphery 96 of the sheave portion 72 in response to rotation of shaft 54. The end of the casing contiguous the roller 94 is slotted at 98 and 100 to straddle a cam 102 which is located on the inner periphery 96 of the detent cage for engaging the roller 94 which imparts rotational movement to the cage for operating the bolt retracting mechanism 12. A second cam 104 is also located about the inner periphery 96 of the detent cage for frictionally engaging the roller to prematurely load the detent cage to retard its rotational movement caused by the return action of the bolt retracting mechanism which unwinds the cable from the sheave 74. A boss 99 is formed integral with the housing 58 and bored at 101 for the passage of the cable 16 which winds onto the sheave 74. The boss 99 is drilled and tapped at 103 to engage an adapter 105 which connects the conduit 18 to the torque limiting drive mechanism.

The sheave 74, which as aforementioned comprises a part of the detent cage 62, has a circumference which is linearly equal to or greater than the length of the stroke required for charging the gun. Expressing this another way, the distance traveled by a point on the sheave opposite the cam 102 about shaft 54 as a pivot point, in response to the driving engagement of the detent mechanism 70, must be at least equal to the linear distnce lug 114 must travel in being retracted from the extreme forward position shown in Figure 4 to a maximum rearward postion when charging of the gun is desired. As a practical matter the circumference of the sheave is always greater than the actual stroke required for charging in order to compensate for any variations in stroke of the same calibre gun, allow for cable stretch and to provide a sheave adaptable for use on more than one type of gun. With reference to Figure 3, the amount of clockwise rotation imparted to the detent cage and sheave by engagement with the detent mechanism is predetermined by the load on the cable. With the approximate load or force required for charging a gun known, the adjusting nut 86 of the detent mechanism is adjusted so that the roller 94 will disengage the cam 102 after the predetermined load on the gun, plus a load safety factor which has been applied to the adjusting unit, has been attained. Disengagement of the cam by the roller allows the bolt retracting mechanism which has been retracted to its maximum rearward position to return to its extreme forward position and in so doing unwinds the cable 16 from the detent cage which is accordingly rotated in a reverse direction. The cam portion 104 is engaged by roller 94 on the return stroke of the charging mechanism to load the detent cage gradually and prevent the roller from striking cam 102 with such force as to carry the roller past the latter cam.

The bolt retracting mechanism 12 is fixedly secured to the gun 10 by screws 106 which engage the gun frame. The retracting mechanism comprises a charging switch 108 normally closed but held in open position during proper gun operation by a switch actuating member 110 pivoted at 112, in response to the engagement of a tab 113 of the switch member, by lug 114 integrally related to a piston extension 116 adapted for reciprocation in cylinder 118. The cylinder 118 is longitudinally slotted at 119 to receive the lug 114 for reciprocating action. A bolt switch 120 normally open is mounted for actuation by the retracting mechanism. The switch is adapted to be closed intermittently during proper gun operation by a switch actuating member 122 pivoted at 123 and having a tab 124 which is engaged by a gun bolt stud 126 as it reciprocates. A piston 128, adapted to engage one end of the cable 16 is fixed to the piston extension 116. A spring 130 urges the piston to its forward position with respect to the gun as shown in Figure 4. During the retracting operation of the bolt retracting mechanism, the piston, piston extension and lug are moved to the left as viewed in Figure 4 to thereby compress spring 130 which collapses around a spring guide 132 over which the piston extension 116 slides. This retracting operation of the piston 116 which has the lug 114 secured thereto carries the gun bolt stud 126 to the rear of the gun to thereby close the bolt switch 120. The cylinder 118 is removably mounted adjacent the gun frame by clamping means 134. Cable adapters 135 and 137 are provided for connecting the wiring of the electrical system to the bolt retracting mechanism 12 and the control box 22 respectively.

The electrical system for operating the bolt retracting mechanism comprises a four-pole double-throw control switch 140 which may be connected to firing position or to safety position depending on the desire of the operator. A trigger switch 142 connects a source 144 which also connects the control switch 140. With the control switch in firing position, closing of the trigger switch 142, which may be located in any desirable position accessible to the operator, energizes firing relay 146 which closes a switch 148 which connects firing solenoid 150 and initiates relay 152 to the control switch. Energizing relay 152 opens switch 154 which is connected to the source 144 through the control switch 140. Time delay relay 156 and condenser 158 are disconnected from the source through switch 154 when this switch is opened but are reconnected to the source intermittently through the bolt switch 120 by the bolt stud 126 when the stud is reciprocated during normal gun operation or by simulated movement of the bolt stud by operation of the bolt retracting mechanism. The time delay relay 156 is adapted to open switch 160 which disconnects power relay 162 from the source through the control switch 140. The power relay 162 includes a double pole switch 164 which connects field winding 166 in series with armature 168 of the charging motor 24. An air circuit breaker 170 is disposed between the source and the switch 164 to provide the desired overload protection for the charging motor. Besides the connection through the switch 160 to the source the power relay 162 has a second and independent connection through the charging switch 108 to the source. The purpose of the charging switch 108 is to insure consummation of the charging cycle once the cycle has been initiated notwithstanding release of the trigger switch 142 which will energize the time delay relay 156 which opens switch 160 to deenergize power relay 162. The electrical system may be conveniently divided into two circuits the first circuit comprising the source 144, a trigger switch 142 and firing relay 146. The second circuit comprises the source 144, switch 140, motor field 166, armature 168, time delay relay 156, electro-magnetic means 162, 164, normally open switch 148, switches 108, 120, firing solenoid 150 and relay 152.

For preventing coasting or prolonged rotation of the charging motor 24 after the power relay 162 has been deenergized switch 164 is adapted to close on a pair of contacts 171 and 172 provided for short circuiting the field winding 166 and armature 168 whereby dynamic braking of the motor is obtained.

The operation of the charging mechanism is as follows: With the control switch in the firing position and the trigger switch 142 closed, the firing solenoid 150 is energized and the initiating relay 152 is energized which opens switch 154 to thereby disconnect the condenser 158 and time delay relay 156 from the current source. However, continued firing will intermittently connect the condenser and the time delay relay to the current source through the bolt operated switch 120. Under the foregoing normal conditions of gun operation the power relay 162 remains deenergized so that the charger motor 24 does not run. The reason that the power relay remains deenergized during normal gun operation is that the time delay relay keeps one of the two connections from the source to the power relay coil open through switch 160, whereas the other connection from the source to the power relay coil is kept open by the charging switch 108 which is held in this position by the lug 114.

Should the gun become jammed or fail to fire, the bolt switch 120 will remain open so that the time delay relay and condenser do not receive a fresh charge from the source through switch 120 in this instance. (During proper gun performance the condenser is charged and then discharged through the time delay relay to keep the same energized long enough to permit a complete cycle of the bolt stud. During each cycle the bolt stud closes switch 120 to energize the time delay relay and also charge the condenser.) The failure to close switch 120 to energize the time delay relay 156 creates a drain on condenser 158 which discharges through the relay 156 to keep the relay energized for a fraction of a second in this case. Simultaneously with the decay of the voltage across the relay 156 below a predetermined value switch 160 is closed to connect the power relay 162 to the source to thereby close switch 164 to connect the charged motor for rotation. The charging motor 24, to which the detent mechanism 70 is connected, now begins to rotate the detent cage for charging the gun. The motor will continue to run until the bolt stud has moved to the left in Figures 1 and 4 to actuate the bolt switch which connects the time delay relay to the source which will cause the switch 160 to open to cut off the current to the power relay to stop the motor. However, in this position of the bolt stud the charging cycle is only half completed. Obviously, it is highly desirable to complete a charging cycle once it is initiated and to this end a charging switch 108 is disposed between the source and the power relay. This switch 108 is closed concurrently with the rearward movement of the charging lug 114 to energize the power relay 162 to keep the switch 164, which controls the charger motor, closed until a cycle has been completed. This arrangement insures a complete charging cycle once the cycle has been initiated in spite of the release of the trigger switch. On the return of the charging lug to its forward position after completion of the charging cycle the charging switch 108 is again opened to disconnect the power relay from the source through this switch. Deenergizing the power relay 162 closes the switch 164 on contacts 171 and 172 which dynamically brakes the charging motor 24.

Should it be desired to safety the gun the control switch is rotated to a safety position which connects the power relay 162 to the source through switch 160 which is closed at this time since the time relay is deenergized at this instant. The charger motor now retracts the charging lug and bolt stud by winding the cable 16 onto the sheave 74 in the same manner as during any charging cycle except that when the control switch is in the safety position the second current supply to the power relay coil through the charging switch 108 is not connected and as soon as the bolt stud 126 has moved to the left in Figures 1 and 4 to close the bolt switch 120 which energizes the time delay relay, the power relay circuit is opened by switch 160 thus causing the motor to stop, with the charging lug and bolt stud in a retracted position. That is, the bolt stud is moved rearwardly by the charging lug until the bolt switch is closed at which time the motor is dynamically braked to stop the charging operation.

The control switch may now be moved to off or neutral position with the gun remaining in safety position with all power disconnected. When the control switch is returned to the firing position the current supply to the power relay 162 through charging switch 108 is available for energizing this relay which operates switch 164 for starting the charging motor. The motor will run until the charging lug has returned to its forward position to open the charging switch which cuts off the current supply to the power relay.

We claim:

1. In combination with an automatic gun having a portion reciprocable during normal gun operation, a mechanism mounted on the gun and having a member for engaging the reciprocable portion to retract the same and then release it for countermovement, a torque limiting drive device connected to the mechanism to operate the same to simulate normal movement of the reciprocable portion when charging of the gun is desired, an electrical system comprising first and second circuits connected to a source of current, a time delay relay in the second circuit having two connections to said source, a normally open switch in one of said connections and mounted on the gun and constructed and arranged to be closed intermittently in response to reciprocation of said reciprocable portion during normal gun operation to keep said time delay energized, a normally closed switch in the other of said connections, a relay in the second circuit normally disconnected therefrom and arranged therein to control said normally closed switch, a motor in the second circuit drivably connected to the torque limiting device, electro-magnetic means for controlling said motor, a normally closed switch connecting the electro-magnetic means to said source and constructed and arranged to respond to energization of the time delay relay to open said switch, a trigger switch in the first circuit, and means in the first circuit comprising a normally open switch located in the second circuit actuable by said means which is energized by closing the trigger switch for closing said last mentioned normally open switch for connecting the aforesaid relay to the second circuit to open said normally closed switch in said other connection so that the time delay relay is energized only by the intermittent closing of said normally open switch in said one connection during normal gun operation and is deenergized upon malfunction of said gun, whereby said normally closed switch connecting the electro-magnetic means to the source is closed to connect the motor for driving said torque limiting device.

2. In combination with an automatic gun having a portion reciprocable during normal gun operation, a mechanism mounted on the gun and having a member for engaging the reciprocable portion to retract the same and then release it for countermovement, a torque limiting drive device connected to the mechanism to operate the same to simulate normal movement of the reciprocable portion when charging of the gun is desired, an electrical system comprising first and second circuits connected to a source of current, a time delay relay in the second circuit having two connections to said source, a normally open switch in one of said connections and mounted on the gun and constructed and arranged to be closed intermittently in response to reciprocation of said reciprocable portion during normal gun operation to keep said time delay energized, a normally closed switch in the other of said connections, a relay in the second circuit normally disconnected therefrom and arranged therein to control said normally closed switch, a motor in the second circuit drivably connected to the torque limiting device, electro-magnetic means for controlling said motor, a normally closed switch connecting the electro-magnetic means to said source and constructed and arranged to respond to energization of the time delay relay to open said switch, a trigger switch in the first circuit, means in the first circuit comprising a normally open switch located in the second circuit actuable by said means which is energized by closing the trigger switch for closing said last mentioned normally open switch for connecting the aforesaid relay to the second circuit to open said normally closed switch in said other connection so that the time delay relay is energized only by the intermittent closing of said normally open switch in said one connection during normal gun operation and is deenergized upon malfunction of said gun, whereby said normally closed switch connecting the electro-magnetic means to the source is closed to connect the motor for driving said torque limiting device, and a second connection from the source to the electro-magnetic means, a switch in the second connection mounted on the gun and held in a normally open position by the bolt retracting mechanism during normal gun operation but arranged to close during bolt retracting movement to complete a charging cycle once initiated irrespective of the position of the trigger switch.

GEORGE A. GOEPFRICH.
WILLIAM C. ROHN.

REFERENCES CITED

The following references are of record in the file of this patent:

UNITED STATES PATENTS

| Number | Name | Date |
|---|---|---|
| 975,564 | Motter | Nov. 15, 1910 |
| 2,055,681 | Cartlidge | Sept. 29, 1936 |
| 2,071,020 | Boussel | Feb. 16, 1937 |
| 2,115,958 | Lee | May 3, 1938 |
| 2,116,860 | Blaylock et al. | May 10, 1938 |
| 2,180,751 | Wagner | Nov. 21, 1939 |
| 2,332,631 | Gasser | Oct. 26, 1943 |
| 2,340,705 | Slate | Feb. 1, 1944 |
| 2,389,737 | Neuschotz | Nov. 27, 1945 |
| 2,397,507 | Roberts | Apr. 2, 1946 |
| 2,431,079 | Richey | Nov. 18, 1947 |